United States Patent [19]

Nishijima et al.

[11] Patent Number: 4,975,974

[45] Date of Patent: Dec. 4, 1990

[54] CHARACTER RECOGNITION APPARATUS

[75] Inventors: Yasuo Nishijima; Ichiro Kaneko, both of Tokyo, Japan

[73] Assignee: NEC Corporation, Tokyo, Japan

[21] Appl. No.: 477,167

[22] Filed: Feb. 8, 1990

Related U.S. Application Data

[63] Continuation of Ser. No. 115,727, Nov. 2, 1987, abandoned.

[30] Foreign Application Priority Data

Oct. 31, 1986 [JP] Japan ................................. 61-259987

[51] Int. Cl.$^5$ ................................................ G06K 9/68
[52] U.S. Cl. ........................................ 382/34; 382/30
[58] Field of Search ................... 382/9, 10, 13, 30, 34, 382/48

[56] References Cited

U.S. PATENT DOCUMENTS

| | | | |
|---|---|---|---|
| 3,492,646 | 1/1970 | Bene et al. | 382/30 |
| 3,717,848 | 2/1973 | Irvin et al. | 382/30 |
| 3,868,636 | 2/1975 | Schlang | 382/48 |
| 4,630,308 | 12/1986 | Hongo | 382/30 |
| 4,700,401 | 10/1987 | Masatsugu et al. | 382/30 |

Primary Examiner—David K. Moore
Assistant Examiner—Jose L. Couso
Attorney, Agent, or Firm—Sughrue, Mion, Zinn, Macpeak & Seas

[57] ABSTRACT

A character recognition apparatus, for use with an input character pattern and a dictionary of stored character patterns that are blocked into categories, all the patterns having a quantifiable format, in which a judging circuit performs a comparison of the patterns based on the quantifiable format and determines whether the quantified difference exceeds a threshold value in order to determine whether the input and stored character patterns match. The threshold is reduced, as lower mismatch quantities are found for a given character, and when a comparison exceeds the threshold, thereby indicating a mismatch, a new stored character is examined. As among all stored characters that have passed the threshold test, the one with the lowest mismatch quantity is selected as the recognized character.

5 Claims, 5 Drawing Sheets

| NO. | ADDRESS | CONTENT | |
|---|---|---|---|
| 1 | 1000~1009 | DICTIONARY OF "0" | (1) |
| 2 | 1010~1019 | " | (2) |
| 3 | 1020~1029 | " | (3) |
| 4 | 1030~1039 | " | (4) |
| 5 | 1040~1049 | " | (5) |
| 6 | 1050~1059 | DICTIONARY OF "1" | (1) |
| 7 | 1060~1069 | " | (2) |
| 10 | 1090~1099 | " | (5) |
| 11 | 1100~1109 | DICTIONARY OF "2" | (1) |
| 15 | 1140~1149 | " | (5) |
| 16 | 1150~1159 | DICTIONARY OF "3" | (1) |
| 49 | 1480~1489 | DICTIONARY OF "9" | (4) |
| 50 | 1490~1499 | " | (5) |

| ADDRESS | JUMP ADDRESS |
|---|---|
| 1 | 1000 |
| 2 | 1010 |
| 3 | 1020 |
| 4 | 1030 |
| 5 | 1040 |
| 6 | 1050 |
| 45 | 1440 |
| 46 | 1450 |
| 47 | 1460 |
| 48 | 1470 |
| 49 | 1480 |
| 50 | 1490 |

CHARACTER RECOGNITION APPARATUS

This is a continuation of application No. 07/115,727 filed Nov. 2, 1987, now abandoned.

BACKGROUND OF THE INVENTION

The present invention relates to a character recognition apparatus, and more particularly to a character recognition apparatus which previously prepares a plurality of standard character patterns as dictionary patterns to be compared with an input character pattern.

In a conventional character recognition apparatus of this kind, an input character pattern is compared exhaustively with dictionary patterns of a plurality of categories (0 to 9, for example, in a numerical character). In this case, a plurality of dictionary patterns are prepared with respect to one category in order to recognize various character shape modifications or various character fonts. Then, at least one dictionary pattern with the greatest degree of coincidence or the least degree of mismatch is detected and the character category corresponding to the detected dictionary pattern is determined finally as the basis for comparison with the input character pattern.

In the comparing process, though the input character pattern is compared with many dictionary patterns covering a plurality of categories, when the mismatch degree exceeds a predetermined threshold during the comparing operation, the comparison with this dictionary pattern is immediately interrupted so as to proceed with a comparison with the next dictionary pattern. When the mismatch degree does not exceed the threshold, a dictionary pattern along code corresponding to the dictionary pattern with the mismatch degree is sequentially stored in a memory. Based on this stored information, a dictionary pattern code with the least mismatch degree is finally selected, and a category corresponding to the code is obtained as a recognition result.

In an alternative recognition process, it is customary that not only a similarity to the dictionary pattern but also another factor, for example, the result of a recognition process for a previous character in an input character train, is used for synthetic recognition. In this case, in addition to the candidate with the greatest degree of coincidence (the lowest mismatch degree), other candidates having greater degrees of coincidence are also selected through the comparison process as candidates.

In conventional recognition apparatus, when an input character has been compared with all the dictionary patterns, dictionary pattern codes with corresponding mismatch degrees less than a predetermined threshold are stored in the memory. However, in this case, a plurality of dictionary pattern codes corresponding to the same category often are uselessly stored in the memory. Accordingly, an additional; process to detect the least mismatch degree in the same category is disadvantageously needed to deliver a plurality of categories having the least mismatch degrees as candidates.

In the above-described conventional character recognition apparatus, the comparison operation between an input pattern and a dictionary pattern is interrupted only when a mismatch degree exceeds a fixed predetermined threshold. When the mismatch degree does not exceed the threshold, a plurality of dictionary pattern codes with mismatch degrees corresponding to the same category are uselessly stored and a process to detect the least mismatch degree in the same category is necessary. As a result, the conventional character recognition apparatus requires a relatively long time for character recognition.

SUMMARY OF THE INVENTION

An object of the invention is therefore to provide a character recognition apparatus capable of drastically reducing a time for character recognition.

According to the present invention, there is provided a character recognition apparatus for recognizing an input pattern among a plurality of character categories, which comprises a dictionary memory for storing dictionary patterns, the dictionary patterns being grouped in accordance with the character categories, an address memory for storing start addresses of respective dictionary patterns for each group, a comparator for comparing the input pattern with the standard pattern, a counter for counting a mismatch degree between the input pattern and the standard pattern, an interruption circuit for interrupting a mismatch degree counting process at point in time when the mismatch degree exceeds a threshold and reading a start address of the next standard pattern, an updating circuit for updating the threshold to a value equal to the mismatch degree when the mismatch degree does not exceed the threshold in order to seek the least mismatch degree for each group, a computing circuit for computing the least mismatch degrees for every category, a determining circuit for determining the input pattern as one of the categories by detecting the smallest one among the least mismatch degrees.

BRIEF DESCRIPTION OF THE DRAWINGS

FIG. 2 is a drawing showing a normalized input character pattern to be recognized;

FIGS. 3(a) and 3(b) are drawings representing one example of a dictionary pattern corresponding to a character category of "5", showing a black (character portion) dictionary pattern and a white (blank) dictionary pattern, respectively;

DETAILED DESCRIPTION OF PREFERRED EMBODIMENT

Figure 1:
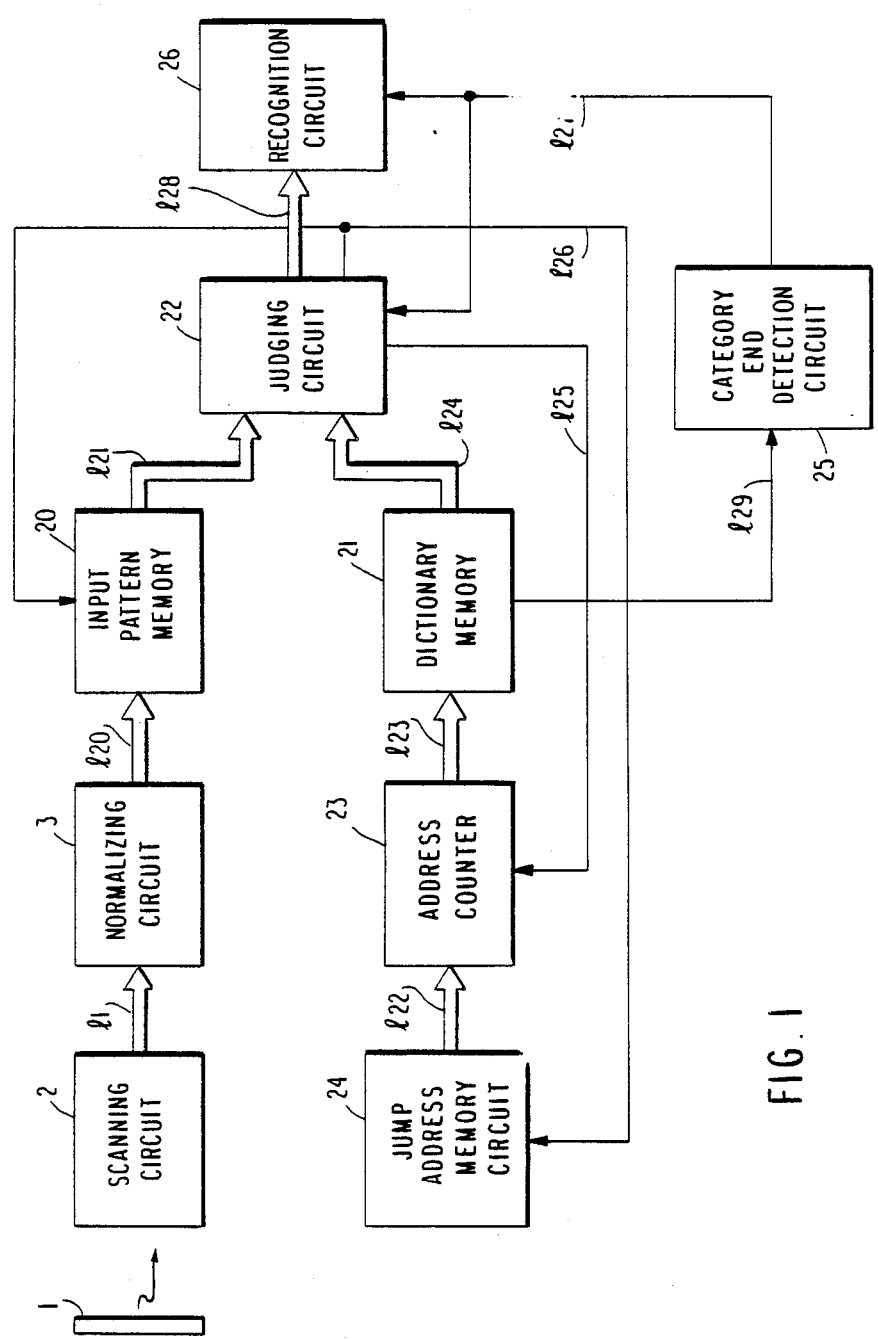
FIG. 1 is a block diagram of an embodiment according to the present invention.

Referring now to FIG. 1 showing one preferred embodiment of the invention, the embodiment comprises a document 1, a scanning circuit 2, a normalizing circuit 3, an input pattern memory 20, a dictionary memory 21, a judging circuit 22, an address counter 23, a jump address memory circuit 24, a category end detection circuit 25, and a recognition circuit 26.

Figures 2, 3A, 3B:
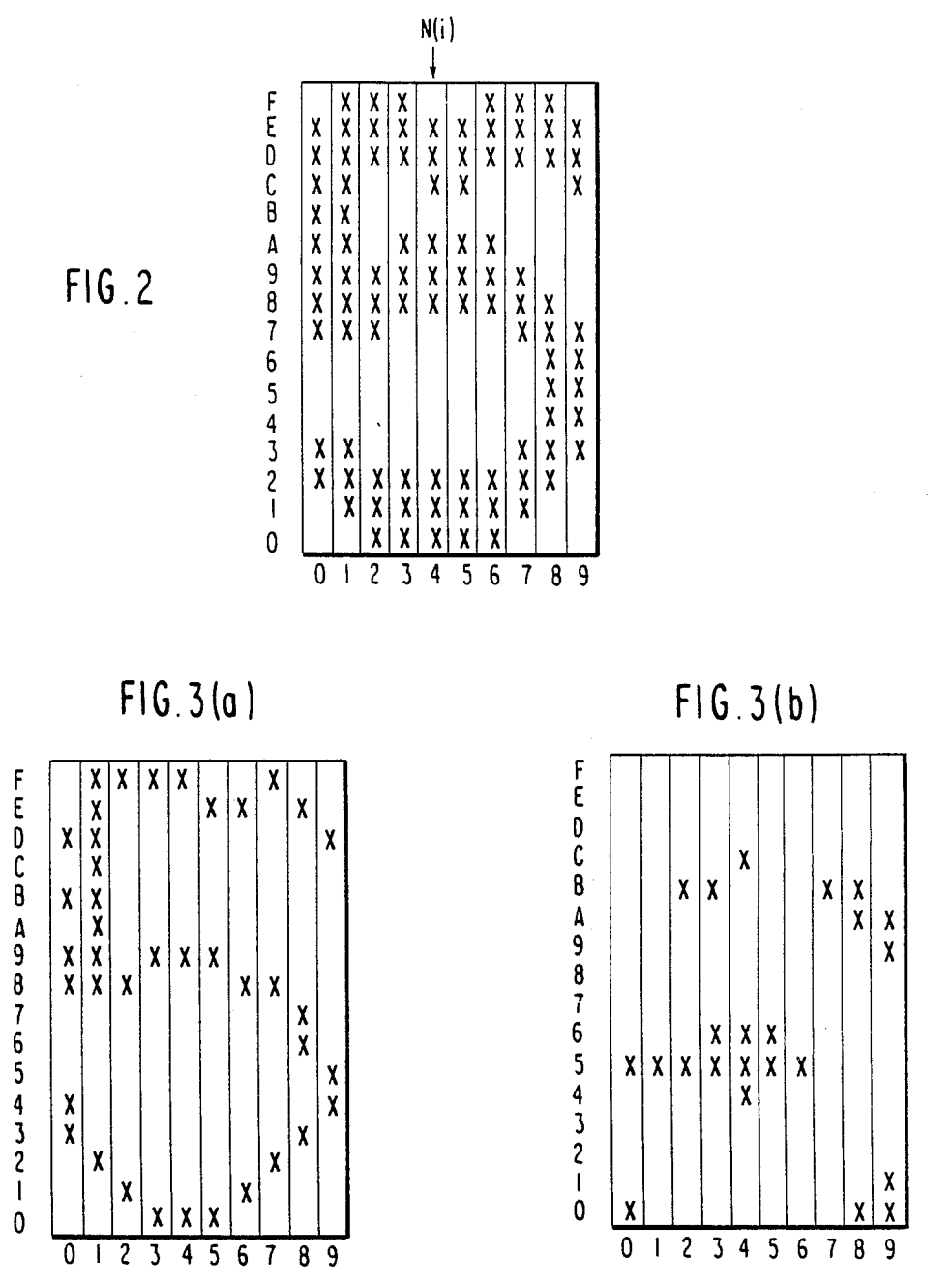

In FIG. 1, a character pattern on the document 1 is scanned by the scanning circuit 2, and a scanning output signal is supplied to the normalizing circuit 3 through a line 11. The normalizing circuit 3 extracts respective character patterns and normalizes them to a predetermined size having, for example, 16 meshes vertically and 10 meshes horizontally. One example of the normalized input pattern is shown in FIG. 2. In the drawing, a mark x indicates a character pattern (black) and a blank indicates a space (white). In the embodiment, the vertical 16 meshes are designated as 0 to F (hexadecimal) upwardly and these 16 meshes are handled as one string for facilitating the description given hereinlater. Furthermore the input character pattern has 0 to 9 strings.

The normalized input pattern is loaded in the input pattern memory 20 through a line 120. The normalized input pattern is supplied to the judging circuit 22 at every string through a line 121.

The address counter 23 for the input pattern memory 20 is initialized when a control signal is delivered through a line 126 to group address memory circuit 24. The signal on the line 126 is a signal generated when the input pattern has been completely compared with one dictionary pattern, and when a mismatch degree (mismatch mesh number) exceeds a set threshold during comparison in the decision circuit 22.

Figures 4, 5, 6:
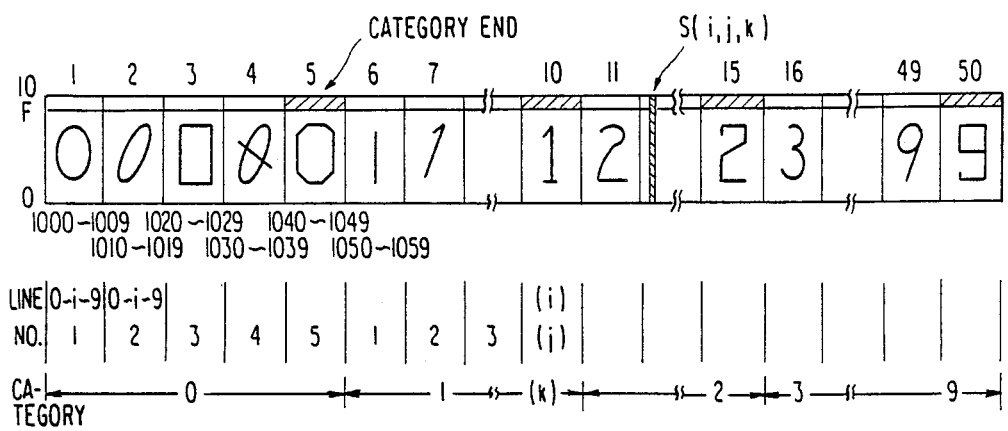
FIG. 4 is a drawing showing dictionary patterns stored in a dictionary memory in the embodiment of the present invention.
FIG. 5 is a drawing representing a coordination between standard patterns in the dictionary memory of FIG. 4 and addresses.
FIG. 6 is a drawing showing contents of a jump address memory in the embodiment according to the invention.

A plurality of dictionary patterns to be compared with the input pattern are stored in the dictionary memory 21. In this embodiment, it is assumed that the input pattern is numerical, and the dictionary patterns of 10 categories "0" to "9" are prepared, each category having plural dictionary patterns. In FIG. 4 showing one example of the contents of the dictionary memory 21, there are five different dictionary patterns for every category. Further, an end code (one bit) indicating the end of one category is assigned in the last dictionary pattern of each category at the 10 (hexadecimal) bit location.

In the embodiment, the input pattern is compared with the dictionary patterns by means of a pattern matching process. The dictionary pattern includes two kinds of patterns, one determining mesh portions to surely be a character portion (black) which is defined as a black dictionary pattern and the other determining mesh portions to surely to be a space portion (blank) which is defined as a blank dictionary pattern. FIGS. 3(a) and 3(b) show one example of the black and blank dictionary patterns of the character category "5". The dictionary pattern is constituted of 16×10 meshes, just as the normalized input pattern.

Referring back to FIG. 1, one string in the dictionary pattern is introduced to the judging circuit 22 from the dictionary memory 21 through a line 124 in accordance with an address supplied through a line 124. To this end, the address counter 23 generates the address of the dictionary memory 21 by counting up by +1 successively from 1000, which is a start address of the dictionary memory 21 as shown in FIG. 4. Further, the address counter 23 sets a jump address introduced through a line 122 when a control signal is generated on a line 125, and introduces the jump address to the dictionary memory 21 through the line 123. In this case, the address counter 23 can be easily constructed by using a well-known preset type counter circuit. The control signal on the line 125 is generated when the mismatch degree (mismatch mesh number) exceeds a threshold while comparing the input pattern with the dictionary pattern in the judging circuit 22. In response to the control signal on the line 125, the comparison is interrupted and then a next comparison with a next dictionary pattern is started. The judging circuit 22 and the control signal on the line 125 will be described in detail hereinafter.

The start address of each dictionary pattern in the dictionary memory 21 shown in FIG. 5 is stored in the jump address memory circuit 24. An address counter (not shown) contained in the jump address memory circuit 24 is counted up in response to the signal introduced through the line 126, i.e., whenever the comparison of the input pattern with one dictionary pattern is completed or interrupted. FIG. 6 shows an example of the content of the jump address stored in the jump address memory circuit 24. Therefore, the address supplied to the address counter 23 through the line 122 is a start address of the dictionary memory 21 corresponding to the next dictionary pattern. That is, in case, for example, the input pattern is compared with the dictionary pattern of No. 2 in FIG. 4 in the judging circuit 22, an address "1020" which is a start address of the standard pattern of No. 3 is introduced to the address counter 23.

The judging circuit 22 compares the input pattern introduced through the line 121 with the dictionary pattern introduced through the line 124 one string by one string in sequence. The resulting mismatch mesh number is counted. When the comparison of the input pattern with one standard pattern is completed without a comparison interruption, i.e., the control signal on the line 125, it is a situation that the mismatch mesh number is smaller than the threshold and, thus, data of the mismatch mesh number is stored in the judging circuit 22. As one particular feature, of the present invention, the data of the mismatch mesh number are set as a new threshold for successive comparison with the next dictionary pattern. The signal on the line 126, indicating either, the completion of the comparison or the comparison interruption, is supplied to the input pattern memory 20 and the jump address memory circuit 24. Therefore, the comparison between the input character and the next dictionary pattern begins from a first string of the input and dictionary patterns. The comparison operation is repeated in such manner until one category ends. Accordingly, data indicating the mismatch mesh number of one category and the corresponding category code are introduced to the recognition circuit 26 through a line 128. In this case, a predetermined threshold for interrupting the comparison is initially set for subsequent comparison operation with the next category in response to a category end signal on a line 127.

In the address counter 23, the start address of the next dictionary pattern delivered through the line 122 is set in response to the comparison interruption control signal on the line 125. Thereby, the comparison of the input pattern with this next dictionary pattern begins. Further, the other control signal on the line 126, which is produced at the comparison interruption time and the comparison completion time, is supplied to the jump address memory circuit 24 to advance its reading address by one.

The category end detection circuit 25 checks the category end code of the 10th bit of the dictionary pattern introduced through a line 129 and detects one category end. The category end detection signal from the circuit 25 is supplied to the judging circuit 22 and to the recognition circuit 26 through the line 127.

The recognition circuit 26 receives data indicating the mismatch mesh number and the corresponding category code stored in the judging circuit 22 through the line 128 in accordance with the signal on the line 127. After this, the recognition circuit 26 selects two candidates, for example, the two smallest mismatch mesh numbers and two corresponding categories and delivers these two categories, as a recognition result.

Figure 7:
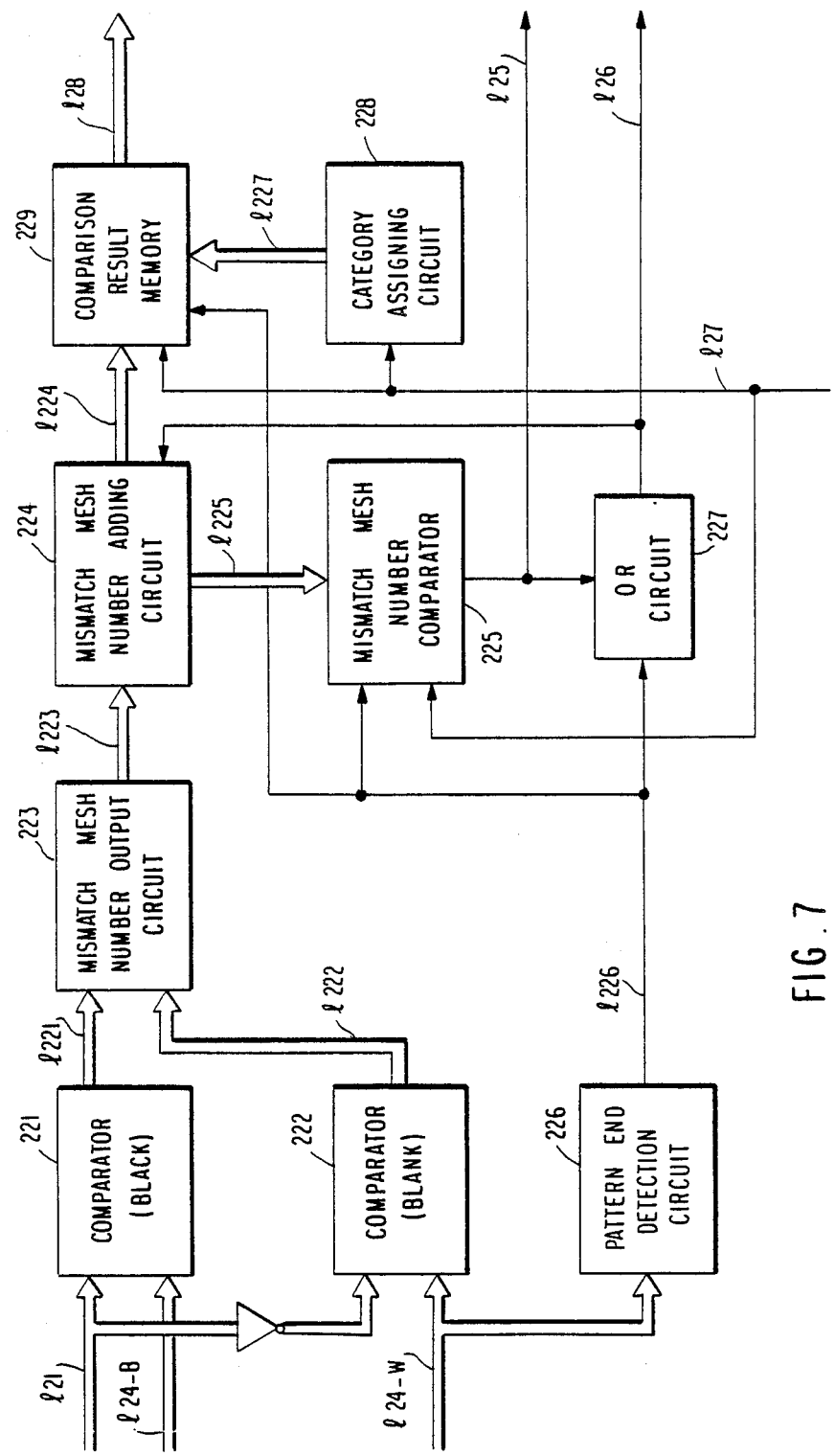
FIG. 7 is a block diagram of one example of a judging circuit in the embodiment of FIG. 1.

FIG. 7 is a block diagram of one example of the judging circuit 22. In this figure, a comparator 221 compares the input pattern introduced through the line 121 with a black dictionary pattern introduced from the dictionary memory 21 (FIG. 1) through a line 124-B at every string. For example, when the fourth string of the input pattern shown in FIG. 2 is compared with the fourth string of the dictionary pattern shown in FIG. 3(a), a signal state of F bit do not coincide with each other, therefore a mismatch signal of the F bit is generated. On the other hand, a comparator 222 receives an inverted pattern of the input pattern through the line 121 and the blank dictionary pattern through a line 124-W, and them compares then. When, the fourth strings of the input pattern and the blank dictionary pattern shown in FIG. 2 and FIG. 3(b) are compared, a signal state of C bit do not coincide with each other and, therefore, a mismatch signal of the C bit is generated.

A mismatch mesh number output circuit 223 computes a logical sum of the mismatch signals delivered from the comparators 221 and 222 through lines 1221 and 1222 for each string, and supplies the logical sum to a mismatch mesh number adding circuit 224 through a line 1223. The mismatch mesh number adding circuit 224 sequentially adds the mismatch mesh number. The addition result is supplied to a mismatch mesh number comparator 225 through a line 1225 and stored in a comparison result memory 229 through a line 1224 in response to a pattern end signal on a line 1226 if the interruption control signal is not delivered from the comparator 225 into the line 125. In this case, the addition result computed in the mismatch mesh number adding circuit 224 is cleared to zero in response to the pattern end signal on the line 126.

The mismatch mesh number comparator 225 compares the mismatch mesh number added by the mismatch mesh number adding circuit 224 with a threshold and delivers the interruption control signal on the line 125 when the mismatch mesh number exceeds the threshold. In the comparator 225, the threshold is set to a predetermined initial value in response to the category end signal on the line 127 and, after this, it is incremented to a smaller mismatch mesh number supplied from the adding circuit 224 in response to the pattern end signal on the line 1226 if the comparison interruption control signal is not generated. The interruption control signal on the line 25 is supplied to an OR circuit 227 and OR-gated with the pattern end signal on the line 1226. The OR-output is delivered on the line 126.

A pattern end detection circuit 226 counts the number of strings of the dictionary pattern supplied through the line 124-W and detects an end timing of one dictionary pattern to deliver the pattern end signal described above.

The category assigning circuit 228 assigns a category of the corresponding dictionary pattern and supplies its category code to the comparison result memory 229 through a line 1227 in response to the category end signal on the line 27. Therefore, the comparison result memory 229 subsequently stores a set of the category code and the smallest mismatch mesh number of this category in response to the category end signal on the line 127. Accordingly, when the input pattern is compared with the dictionary patterns of all categories, the comparison result memory 229 stores ten category codes with the corresponding smallest mismatch mesh numbers. These ten category codes with the smallest mismatch mesh numbers are supplied to the recognition circuit 26 (FIG. 1) through the line 28.

Figure 8:
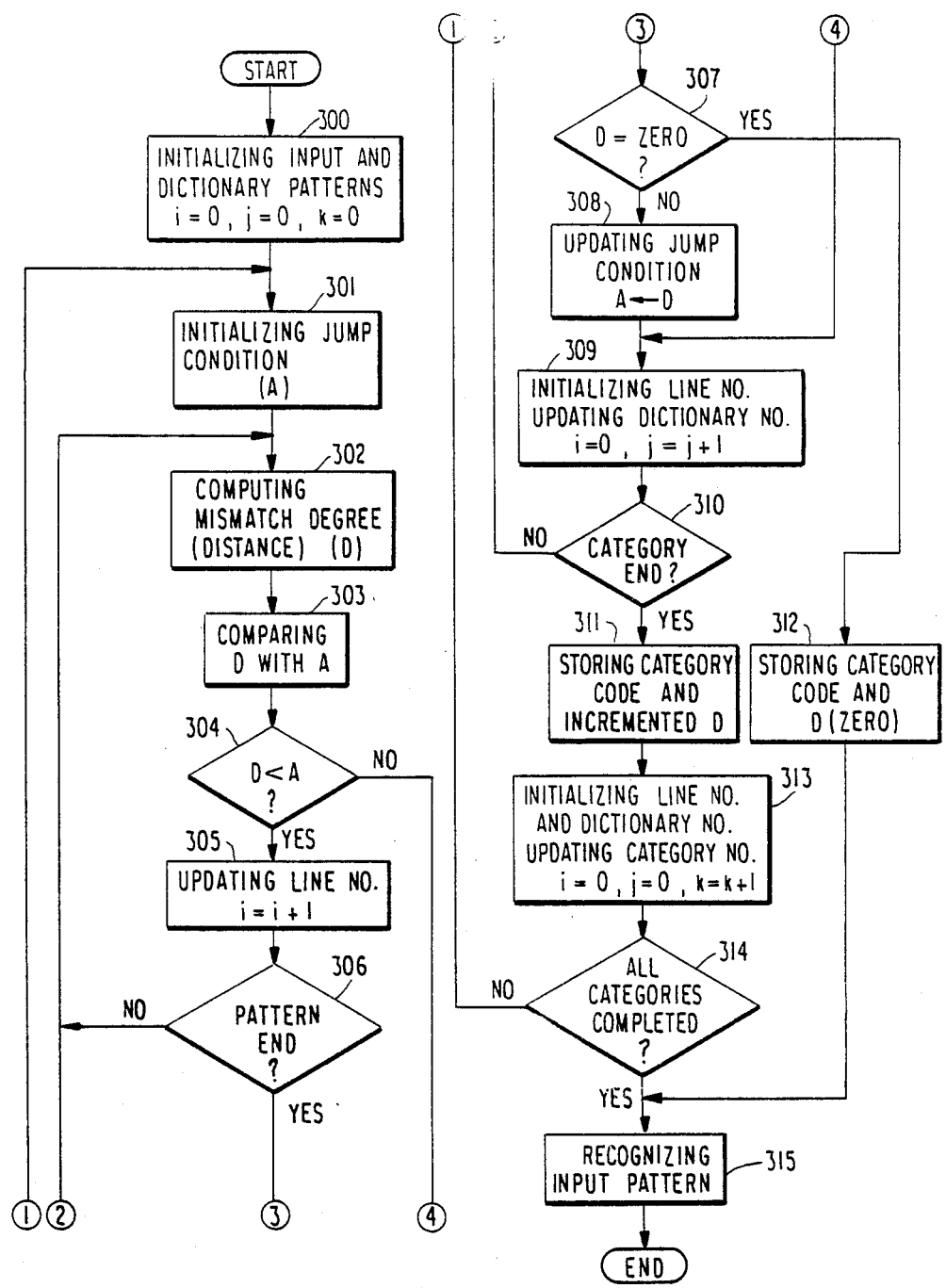
FIG. 8 is a flowchart indicating a process flow of a character recognition according to the present invention.

In this embodiment, when the mismatch mesh number obtained in the adding circuit 224 always exceeds the predetermined initial value of the threshold with respect to one category, the predetermined initial value remains in the comparison result memory 229 as the mismatch mesh number for this category FIG. 8 is a flowchart showing a comparison process according to the invention. In this flowchart, a step 300 performs initialization of the input pattern and the dictionary pattern. Here, N(i) indicates an i-th string (line) of the input pattern in FIG. 2. Further, S(i,j,k) indicates an i-th line of a j-th dictionary pattern of a k-th category. A step 301 performs initialization of the interruption condition (jump condition), i.e., giving the predetermined initial value A as the threshold. The initial value A is set before starting the comparison with the first dictionary pattern of each category A step 302 performs computing the mismatch mesh number (a distance) D while comparing the input pattern N(i) with the dictionary pattern S(i,j,k) in sequence. A step 303 performs comparing the threshold A with the distance D. At a step 304, when the former is smaller than the latter, the process is shifted to step 305, but when the converse occurs, the process is shifted to step 309 to start comparison with the next dictionary pattern. The step 305 performs updating a line No. +1. A step 306 performs checking whether or not comparison between an input pattern and one standard pattern is completed. If not yet, then the process is shifted to step 302, but if completed, the process is shifted to step 307. Step 307 performs checking whether or not the distance D is zero, i.e., completely matched. When completely matched, process is shifted to step 312, but when not, then the process is shifted to step 308. In this flow, step 308 is provided for shortening a recognition processing time further. A process corresponding to step 308 is not included in the embodiment of FIG. 1, but it is easy to include the process in FIG. 1.

Step 308 performs changing the jump condition of the value A to that of the distance D as D is smaller than A, thereby updating the jump condition value smaller. Step 309 performs initializing a comparison line to i=0, and updating a dictionary pattern No. to $j=i+1$. Step 310 performs checking whether or not comparison with respect to one category is completed. If not yet completed, a process is shifted to step 302, but if completed, then the process is shifted to step 311.

Step 311 performs loading the category code and the distance D in a memory. Step 312 performs loading the category code and the distance D (zero) in the memory when the distance D is zero. Step 313 performs initializing a comparison line No. to i=0, initializing the comparison dictionary pattern No. to j=0, and updating the category No. to $k=k+1$. Step 314 performs checking whether or not comparison of all categories is completed. If not yet, a process is shifted to step 301, but if completed, then a process is shifted to step 315. Step 315 performs selecting at least one category candidate by detecting the minimum distance among the distances D of every categories loaded in the memory.

In the embodiment as described above, the input pattern is compared with the dictionary pattern by means of the pattern matching method, however, the present invention is not necessarily limited thereto, and can be applied, of course, to all character recognition methods if a similarity between a input pattern and a dictionary pattern can be extracted as a quantity factor.

As described above, by blocking dictionary patterns with each category in the dictionary memory, updating the threshold to an extracted smaller value for interrupting a comparison with respect to one category, and obtaining one minimum mismatch value for each category as a result, the present invention can drastically reduce a processing time for character recognition.

What is claimed is:

1. A character recognition apparatus comprising:
    scanning means for scanning a character;
    input pattern generating means, coupled to said scanning means, for generating an input pattern, said input pattern having a qualifiable comparison format;
    dictionary pattern storing means for storing a plurality of dictionary patterns for each of a plurality of categories, each of said dictionary patterns having said comparison format;
    pattern comparison means, coupled to said input pattern generating means and said dictionary pattern storing means, for performing a comparison based on said comparison format between said input pattern and one dictionary pattern of one category delivered from said dictionary pattern storing means, and for generating a quantity identifying a degree of mismatch between said input pattern and said one dictionary pattern;
    quantity comparing means, coupled to said pattern comparison means, for comparing said mismatch degree quantity with a threshold value;
    operation interrupting and terminating means, coupled to said quantity comparing means, for interrupting and terminating an operation of said pattern comparison means when said mismatch degree quantity exceeds said threshold value to enable said pattern comparison means to accumulate a mismatch degree between said input between and another dictionary pattern of said one category; and
    updating means, coupled to said quantity comparing means, for updating said threshold value to a value equal to said mismatch degree quantity when the comparison operation of said pattern comparing means is performed completely over the entire comparison format of said one dictionary pattern.

2. A character recognition apparatus as claimed in claim 1, further comprising:
    means responsive to said updating means for advancing said pattern comparison means to compare said input pattern with another dictionary pattern of said one category in order to generate a new mismatch degree quantity; and
    means for determining a mismatch level with respect to said one category by obtaining the smallest updating mismatch degree quantity.

3. A character recognition apparatus as claimed in claim 2, further comprising:
    means for computing respective mismatch levels with respect to a plurality of said categories;
    means coupled to said computing means for recognizing said input pattern by selecting one category having the smallest mismatch level.

4. A character recognition apparatus for recognizing plural kinds of characters, comprising:
    scanning means for scanning graphic characters appearing in any of several styles,
    preprocessing means for generating an individual input character pattern having a quantifiable format from an output of said scanning means,
    standard pattern storing means for storing a plurality of standard pattern groups respectively associated with said plural kinds of characters, each of said standard pattern groups containing a plurality of standard, like-formatted patterns, each having a like format, according to deformation and types of the characters,
    standard pattern reading means for reading a plurality of standard patterns in sequence from said standard pattern storing means for every kind of character.
    mismatch quantifying means for quantifying a mismatch degree in a pattern by comparing on the basis of said like format the standard pattern read out from said standard pattern storing means in accordance with a control of said standard pattern reading means with said input character pattern generated by said preprocessing means.
    comparing means for comparing the mismatch degree quantified by said mismatch quantifying means with a threshold to interrupt and terminate the comparison of said input pattern with the standard pattern when said mismatch degree exceeds said threshold.
    controlling means, responsive to termination of said comparison, for controlling said standard pattern reading means to read a next standard pattern to be compared with said input pattern.
    updating means for updating said threshold to the mismatch degree when the mismatch degree quantified by said mismatch quantifying means becomes less than said threshold during a comparison of the input character pattern with all the standard patterns,
    mismatch storing means for storing and outputting least mismatch degrees output by said mismatch quantifying means with respect to said plurality of said standard pattern groups, and
    determining means, receiving said least mismatch degrees from said mismatch storing means, for determining said input character pattern as one of said plural kinds of characters by selecting the smallest one of said least mismatch degrees.

5. A character recognition apparatus for recognizing an input pattern among a plurality of character categories, comprising:
    dictionary storing means for storing blocks of standard patterns in a dictionary memory in accordance with said character categories.
    address storing means for storing start addresses for said blocks of said standard patterns.
    comparing means for comparing an input pattern with each of said standard patterns of each of said blocks.
    quantifying means for quantifying a mismatch degree between said input pattern and said each of said standard patterns of said each of said blocks.

interrupting and terminating means for interrupting and terminating a collation processing when said quantified mismatch degree exceeds a threshold, address reading means for reading a start address of a next one of said standard patterns of said each of said blocks, updating means for updating said threshold to a value corresponding to the mismatch degree when said mismatch degree does not exceed said threshold in order to seek a least mismatch degree for each block, generating means for generating the least mismatch degree for every category to define a plurality of least mismatch degrees, and determining means for determining said input pattern as one of said categories by detecting the smallest mismatch degree out of said least mismatch degrees.

* * * * *

UNITED STATES PATENT AND TRADEMARK OFFICE
CERTIFICATE OF CORRECTION

PATENT NO. : 4,975,974

DATED : December 4, 1990

INVENTOR(S) : Yasuo Nishijima et al.

It is certified that error appears in the above-identified patent and that said Letters Patent is hereby corrected as shown below:

Col. 1, line 34, delete "along";

line 35, after "pattern" insert --along--.

Col. 3, line 55, delete "124" and insert --123--.

Signed and Sealed this

Nineteenth Day of May, 1992

Attest:

DOUGLAS B. COMER

Attesting Officer

Acting Commissioner of Patents and Trademarks